June 30, 1964 S. GERESY 3,139,291
TRAILER HITCH LOCKING DEVICE
Filed Dec. 22, 1961 3 Sheets-Sheet 2

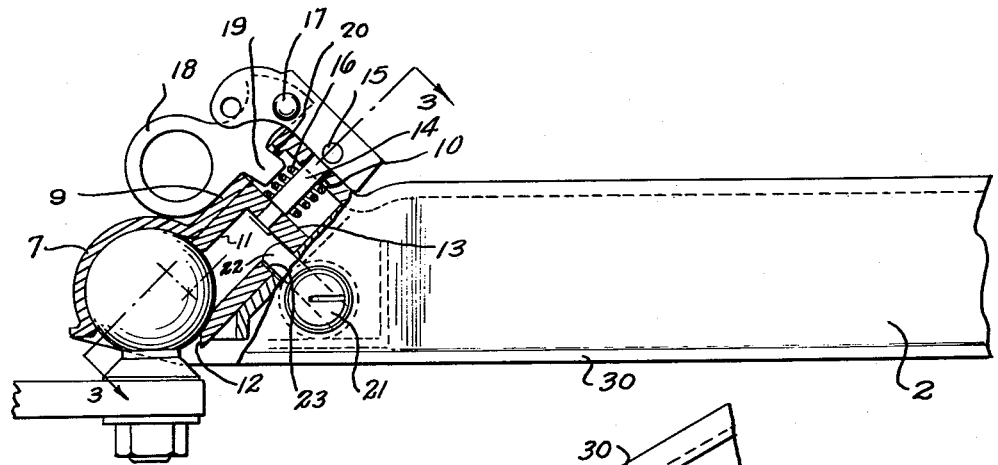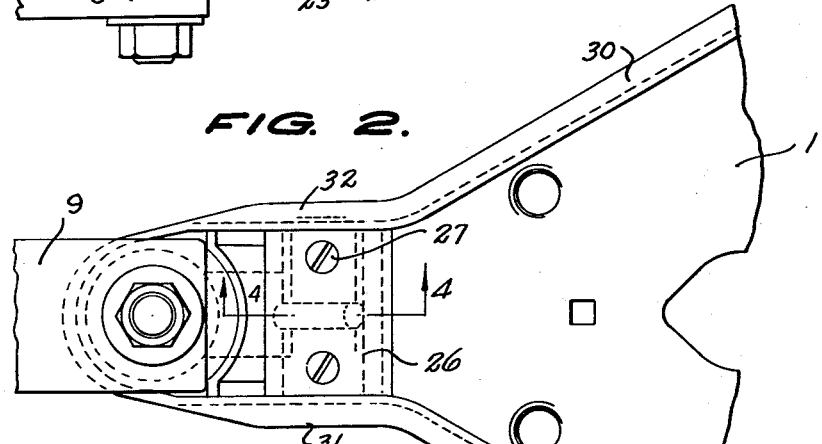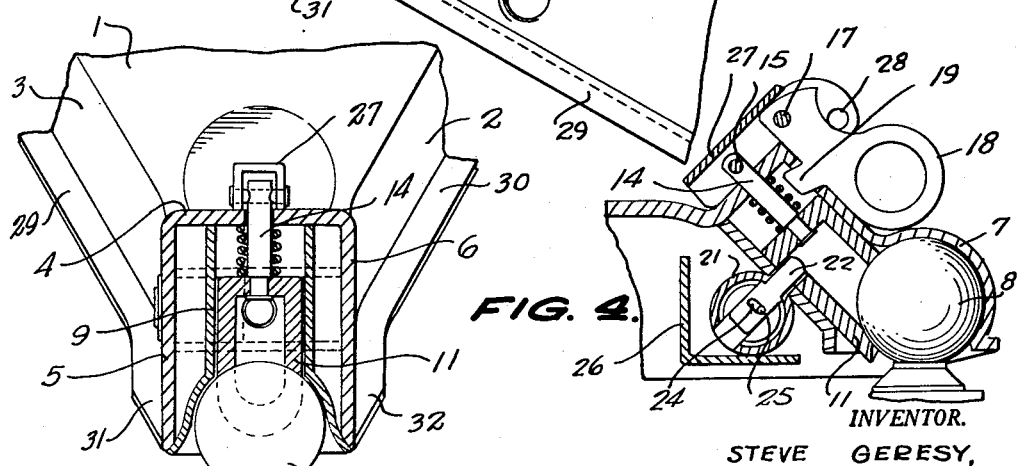

INVENTOR.
STEVE GERESY,
BY Linton + Linton
ATTORNEYS.

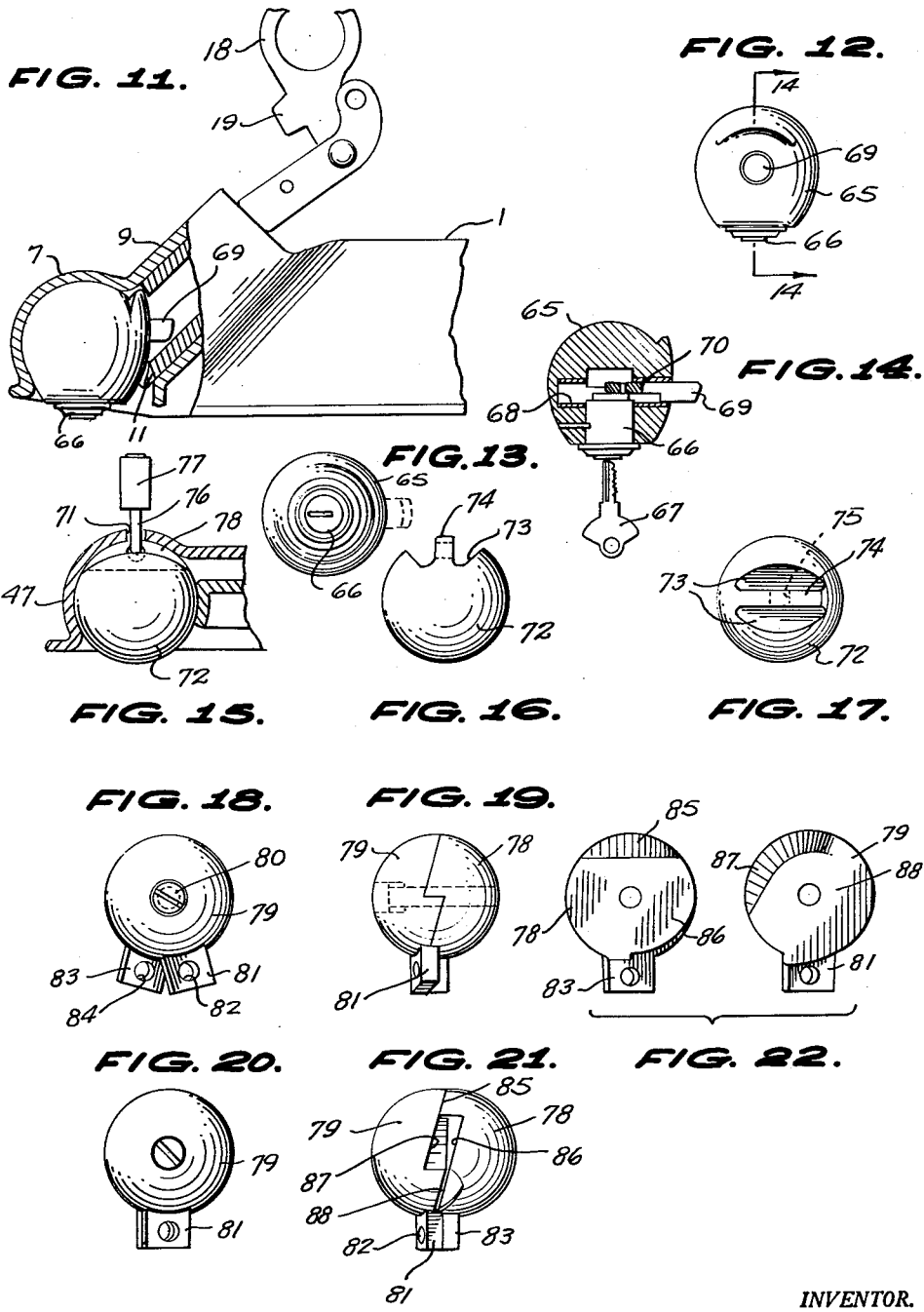

United States Patent Office 3,139,291
Patented June 30, 1964

3,139,291
TRAILER HITCH LOCKING DEVICE
Steve Geresy, 3511 E. McBerry, Tampa, Fla.
Filed Dec. 22, 1961, Ser. No. 161,607
3 Claims. (Cl. 280—507)

The present invention relates to trailer hitches and is more particularly concerned with means for preventing the unauthorized connection of trailer hitches to a prime mover.

The principal object of the present invention is to provide devices for use in combination with existing trailer hitches already connected to a trailer for preventing an unauthorized person from connecting a towing vehicle to the hitch when the trailer is temporarily disconnected from its own prime mover as when parked.

Another and important object of the invention is to provide a trailer hitch of a conventional ball type connector modified to prevent the unauthorized joining thereof to a towing vehicle which can be modified at the factory or by which hitches in use can be modified.

Further objects of the invention will be in part obvious and in part pointed out in the following description of the accompanying drawings in which:

FIG. 1 is a side elevation partly in section of a portion of a trailer hitch modified in accordance with the present invention.

FIG. 2 is a bottom view of FIG. 1.

FIG. 3 is a cross-sectional view taken on line 3—3 of FIG. 1.

FIG. 4 is a cross-sectional view taken on line 4—4 of FIG. 2.

FIG. 11 is a longitudinal sectional view of the end portion of a trailer hitch with a locking ball in accordance with the present invention therein in its locked position.

FIG. 12 is a side elevation of said locking ball.

FIG. 13 is a bottom view of said ball.

FIG. 14 is a cross-sectional view of said ball with its operating key.

FIG. 15 is a longitudinal sectional view of an end portion of a trailer hitch with a modified form of locking ball therein.

FIG. 16 is a side elevation of said modified form of locking ball.

FIG. 17 is a top view of FIG. 16.

FIG. 18 is side elevation of a third form of locking ball in its unlocked position.

FIG. 19 is a side view normal to FIG. 18.

FIG. 20 is a view similar to FIG. 18 but, with the ball in its locked position.

FIG. 21 is a side view normal to FIG. 20 and FIG. 22 is an exploded view of the two halves of the third form of locking ball.

Figure 5:
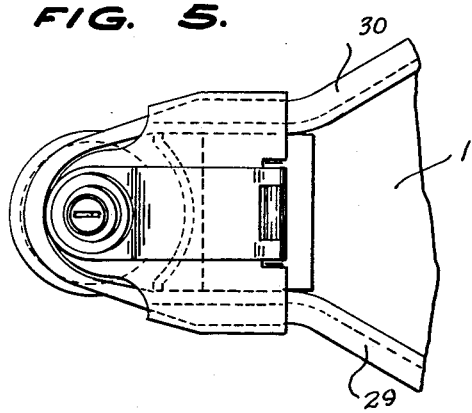
FIG. 5 is a bottom view of a portion of a trailer hitch with a locking plate in accordance with the invention in its locking position thereon.
Figure 7:
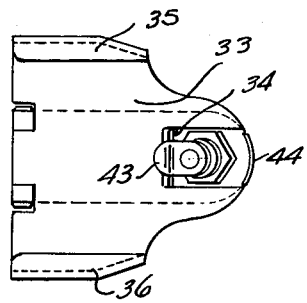
FIG. 7 is a top view of the locking plate of FIG. 5 in its locked position.
Figure 6:
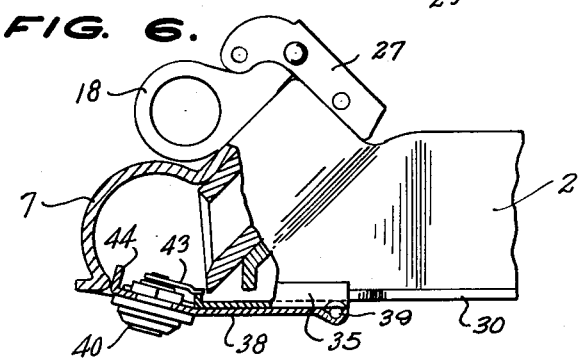
FIG. 6 is a side elevation of the hitch and locking plate of FIG. 5, but partly in section.

Referring now more particularly to the accompanying drawings wherein like and corresponding parts are designated by similar reference characters, numeral 1 indicates the top plate of a conventional type of trailer hitch such as used for example on the towing end of a house trailer and which includes sides 2 and 3 slanting together and having parallel end walls 6 and 5 respectively terminating in a partly spherical open bottom end 7 capable of receiving a ball 8 attached to a towing vehicle in the conventional manner. A tubular wall 9 extends on a slant from end 7 towards plate 4 extending between walls 5 and 6. A pin 14 slideably extends through opening 10 in plate 4 and is connected to head 13 of a cylindrical member 11 having an end 12 shaped to engage ball 8 and which member 11 is slideably positioned in tubular wall 9.

Pin 14 is connected to axle 15 and is surrounded by a coil spring 16. An axle 17 is connected to lever 18 which has a tongue 19 for extending through opening 20 in wall 9 preventing movement of member 11.

To prevent the insertion of a ball 8 in end 7 by unauthorized persons a conventional cylinder lock 21 is fixedly mounted through wall 6 and extends to wall 5 to which it is connected by welding and the like. Lock 21 has a tongue 22 extending laterally therefrom for insertion through opening 23 of member 11 to prevent the movement of said member. Tongue 22 has a slot 24 in which is positioned a pin 25 which is connected to and rotates with the cylinder of the lock for moving tongue 22 into and from opening 23 as desired.

By turning lock 21 with the proper key, tongue 22 is moved through opening 23 so that a ball 8 cannot enter end 7. Turning said lock in the opposite direction with the key withdraws tongue 22 and by lifting lever 18 withdrawing tongue 19, pin 14 can be pulled outwardly moving member 11 from end 7 permitting the introduction of a ball 8 therein. Releasing pin 14 causes member 11 to engage the ball due to the force of spring 16 retaining the ball in end 7 connecting the trailer to its prime mover.

The locking plate 33 shown in FIGS. 5 to 9 inclusive is for use with trailer hitches 1 having flanges 29 and 30 for walls 2 and 3 and flanges 31 and 32, as shown in FIGS. 1 to 3, for walls 5 and 6 extending laterally from said walls. Said plate has a longitudinal end recess 34 and longitudinally extending marginal bent portions 35 and 36 capable of slideably receiving flanges 32 and 31 respectively therein when plate 33 is slid onto the bottom of end 7 until stopped by flanges 29 and 30. A pin 37 fixedly connected to plate 33 is encircled by end 39 of a leaf 38 for pivoting to and from said plate. Leaf 38 has a conventional cylinder lock 40 mounted through the free end thereof for being turned by key 41. The end 42 of the lock cylinder has latch 43 fixedly connected thereto for rotation therewith. An upright 44 is provided by the end of leaf 38 while an upright 45 extends from plate 33 for having latch 43 positioned thereon.

Figure 8:
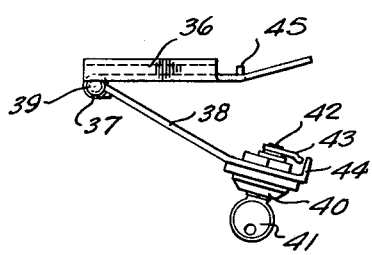
FIG. 8 is a side elevation of the locking plate in its unlocked position.

In use plate 33 is slid onto the bottom of hitch 1 while in its unlocked condition as shown in FIG. 8. Thereafter leaf 38 is pivoted against plate 33 with lock 40 extending through recess 34 whereupon key 41 is turned turning latch 43 to the position of FIGS. 6 and 7 preventing the pivoting of leaf 38 and with upright 44 abutting end 7 so that plate 33 cannot be slid from end 7 thus preventing the introduction of a ball 8 in said end.

Figure 9:
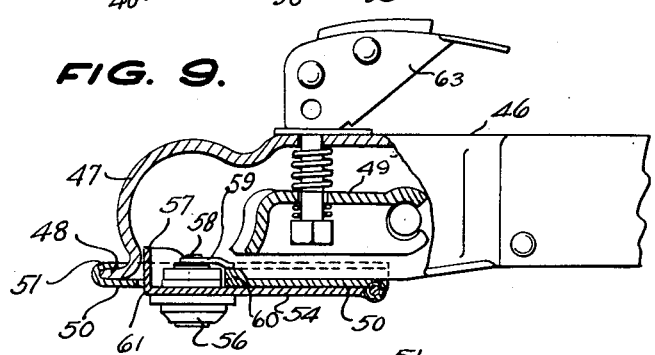
FIG. 9 is a longitudinal sectional view of an end portion of a trailer hitch with a modified form of locking plate in its theft preventative position thereon.
Figure 10:
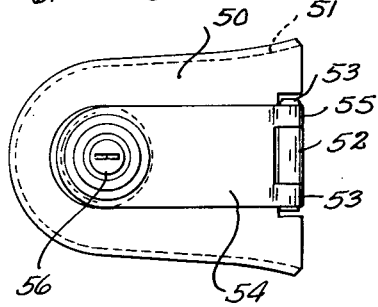
FIG. 10 is a bottom view of the modified form of the locking plate in its locked position.

A modified form of locking plate is shown in FIGS. 9 and 10 for use on trailer hitches, such as, for example, those used on boat trailers and having a plate 46 of a U-shaped cross-sectional configuration and a partially spherical end 47 open at the bottom for receiving a ball 8 therein to be engaged by pivoted lever 49. Said plate 46 has a lateral bottom flange 48 extending from the sides thereof including end 47.

The locking plate 50 has a bent marginal portion 51 of a U-shaped configuration providing a track capable of receiving flange 48 therein when said plate is slid along the bottom of hitch 46.

A pin 52 is fixedly connected to one end of plate 50 and a leaf 54 has curved ends 53 and 55 encircling said pin pivotally connecting said leaf to said plate.

A conventional cylinder lock 56 is mounted through the free end of leaf 54 while said leaf has an upright 57. The cylinder 58 of said lock carries a latch 59 fixedly connected thereto. Plate 50 has an upright 60 for receiving latch 59 thereon when leaf 54 is pivoted against plate 50 inserting lock 56 and upright 57 through an opening 61 in said plate. Turning the proper key in lock 56 turns latch 59 over upright 60 as shown in FIG. 9 preventing the pivoting of leaf 54. Upright 57 abuts end 47 so that plate 50 cannot be slid from said hitch preventing the introduction of a ball 8 in end 47. Turning the key in the opposite direction moves latch 59 from upright 60 allowing leaf 54 to pivot withdrawing lock 56 and upright 57 from end 47 whereupon plate 50 can be slid from said hitch permitting connection to a prime mover.

A locking ball 65 is shown in FIGS. 11 to 14 inclusive for filling the ends 7 or 47 for example to prevent the insertion of balls 8 by unauthorized persons. Ball 65 is shown in FIG. 11 in a hitch 1, but can be equally as well used in hitch 46 by providing a hole in member 49 for tongue 69 or in other hitches.

Said ball 65 which is spherical and of a size for fitting end 7 or the like, has a conventional cylinder lock 66 to be operated by a key 67, inserted therein with a bore 68 for the sliding movement of tongue 69. A pin rotatable by the cylinder of lock 66 extends into tongue 69 for moving the same longitudinally.

After withdrawing pin 14 and inserting ball 65 in end 7 with tongue 69 retracted, turning the key inserts said tongue into the end of member 11 so that said ball cannot be withdrawn until unlocked preventing the introduction of ball 8 and the unauthorized hitching of the attached trailer to a towing vehicle. Turning the key in the opposite direction returns tongue 69 into ball 65 whereupon said ball can be withdrawn from end 7.

A second form of locking ball 72 is shown in FIGS. 15 to 17 inclusive. Ball 72 is of spherical shape for filling end 47 and has a pair of recesses 73 forming tongue 74 which has an opening 75 therethrough.

When ball 72 is inserted in end 47 tongue 74 extends through an opening 71 in the top of said end 47 and bow 76 of padlock 77 is inserted through opening 75 and into said padlock. Since opening 71 is smaller than padlock 77, ball 72 is retained in end 47 preventing the introduction of a ball 8 therein. Unlocking padlock 77 and withdrawing bow 76 from ball 72 permits said ball to be withdrawn from end 47.

In FIGS. 18 to 22 inclusive there is disclosed an expandible locking ball provided by a pair of semi-spherical members 78 and 79. A riveted pin 80 extends through said members 78 and 79 which can slide apart thereon a short distance. Member 78 has a slanting face 86 with a projecting top portion 85, while member 79 has a slanting face 88 with a curved cam 87 projecting from a top portion thereof sliding on projection 85. When said members 78 and 79 are rotated on pin 80 faces 86 and 88 mate as shown in FIG. 21 so that they can be inserted in an end 7 or 47 of a hitch. At such times lugs 81 and 84 of members 79 and 78 respectively are at an angle to one another. Moving lugs 81 and 84 to coincide as shown in FIGS. 20 and 21 rotates members 79 and 78 causing cam 87 to ride on projection 85 moving members 79 and 78 apart along pin 80 expanding the same to completely fill end 7 or 47 whereupon a bow 76 of a lock 77 can be inserted through openings 82 and 84 of said lugs and into padlock 77 for locking said members in said ends.

Unlocking of padlock 77 permits the withdrawal of bow 76 from lugs 81 and 83 whereupon said members can be rotated to their mating position and withdrawn from said ends. As in the previous modifications a ball 8 can then be inserted in said ends for joining trailer and towing vehicle.

The present invention is capable of considerable modification and such changes thereto as come within the scope of the appended claims are deemed to be a part of the invention.

I claim:

1. In a ball type trailer hitch the combination of a trailer hitch having an open bottom partially spherical end recess for receiving a ball attached to a towing vehicle and a lateral flange along said recess open bottom, a plate having U-shaped marginal portions for receiving said flange therein attaching said plate to said hitch and closing said recess open bottom, said plate having an upright positioned for extending into said recess and an opening therethrough, a leaf pivotally connected to said plate and an upright positioned for extending through said plate opening and abutting said hitch end within said end recess and a lock carried by said leaf for extending through said plate opening and having a latch for engaging said plate upright locking said leaf to said plate.

2. An unauthorized use preventing device for trailer hitches having an open bottom end recess with lateral flanges comprising a plate capable of extending across said end recess and having bent marginal edge portions for receiving said lateral flanges therein for retaining said plate on said hitch, said plate having an end recess, a leaf pivotally connected to said plate and having an upright positioned for extending through said plate recess and abutting said hitch within said hitch end recess, and a lock extending through said leaf and a latch for engaging said plate locking said leaf to said plate.

3. An unauthorized use preventing device for trailer hitches having an open bottom end recess with a lateral flange therearound comprising a plate of a configuration for extending across and closing the hitch end recess, said plate having a U-shaped marginal portion for being slid onto the lateral flange connecting said plate to the hitch and closing said end recess, said plate having an upright thereon and an opening therethrough, a leaf pivotally connected to said plate and having an upright positioned for extending through said plate recess when said leaf abuts said plate, said upright abutting said hitch within said hitch end recess when said upright extends through said plate recess, and a lock carried by said leaf having a latch for engaging said plate upright locking said leaf to said plate.

References Cited in the file of this patent

UNITED STATES PATENTS

| | | |
|---|---|---|
| 2,149,189 | Shaffer | Feb. 28, 1939 |
| 2,571,349 | Eckles | Oct. 16, 1951 |